(12) United States Patent
Wu et al.

(10) Patent No.: US 7,215,644 B2
(45) Date of Patent: May 8, 2007

(54) INTER-DOMAIN CONSTRAINT-BASED SHORTEST PATH FIRST TECHNIQUE FOR SUPPORTING HIERARCHICAL ROUTING IN INTERCONNECTED MULTI-DOMAIN OPTICAL TRANSPORT NETWORKS

(75) Inventors: Fuming Wu, Frisco, TX (US); Frederick H. Skoog, Colleyville, TX (US)

(73) Assignee: Alcatel Lucent, Paris (FR)

( * ) Notice: Subject to any disclaimer, the term of this patent is extended or adjusted under 35 U.S.C. 154(b) by 952 days.

(21) Appl. No.: 10/392,227

(22) Filed: Mar. 19, 2003

(65) Prior Publication Data

US 2004/0184441 A1    Sep. 23, 2004

(51) Int. Cl.
*H04J 1/16* (2006.01)
*H04J 3/14* (2006.01)
*H04L 1/00* (2006.01)
*H04L 12/26* (2006.01)

(52) U.S. Cl. ............... 370/248; 370/238; 370/251; 370/254; 709/224; 709/225; 709/227; 714/100; 714/2; 714/8

(58) Field of Classification Search ............ None
See application file for complete search history.

(56) References Cited

U.S. PATENT DOCUMENTS

| | | | |
|---|---|---|---|
| 4,905,233 A | 2/1990 | Cain et al. | |
| 5,067,127 A | 11/1991 | Ochiai | |
| 5,088,032 A | 2/1992 | Bosack | |
| 6,016,306 A | 1/2000 | Le Boudec et al. | |
| 6,301,244 B1 * | 10/2001 | Huang et al. | 370/351 |
| 6,633,544 B1 * | 10/2003 | Rexford et al. | 370/238 |
| 6,785,737 B2 * | 8/2004 | Lee et al. | 709/241 |
| 6,842,463 B1 * | 1/2005 | Drwiega et al. | 370/468 |
| 6,925,061 B2 * | 8/2005 | Lee et al. | 370/238 |
| 6,985,959 B1 * | 1/2006 | Lee | 709/238 |
| 7,031,288 B2 * | 4/2006 | Ogier | 370/338 |
| 7,085,241 B1 * | 8/2006 | O'Neill et al. | 370/254 |
| 7,123,620 B1 * | 10/2006 | Ma | 370/395.32 |

FOREIGN PATENT DOCUMENTS

EP    0 841 824 A    5/1998

OTHER PUBLICATIONS

Vasseur, Jean-Philippe,; "Inter-AS MPLS Traffic Engineering", IETF Standard-Working Draft, Internet Engineering Task Force, IETF, CH, Feb. 2003, XP015005593 ISSN: 0000-0004.

(Continued)

*Primary Examiner*—Chirag G. Shah
(74) *Attorney, Agent, or Firm*—Danamraj & Youst; Jessica W. Smith; V. Lawrence Sewell (57) ABSTRACT

Method and system for implementing an inter-domain constraint-based shortest path first ("IrD-CSPF") technique for supporting hierarchical routing in interconnected multi-domain OTNs are described. In one embodiment, the invention is a method for calculating a network path in an interconnected multi-domain network. The method comprises receiving a path setup request message for a new traffic flow in the network identifying a source node in one domain of the network and a destination node in a second domain of the network; determining a common ancestor hierarchical routing domain that includes ancestor nodes of both the source and destination nodes; calculating an inter-domain path from one ancestor node to the other ancestor node that determines, for each lower-level domain, border nodes in the domain from the source node to the destination node; and for each bottom-level domain, calculating an intra-domain path between the border nodes that were determined for the domain.

30 Claims, 5 Drawing Sheets

OTHER PUBLICATIONS

Lucent Lucent UUNET/Worldcom: "A BGP/GMPLS Solution for Inter-Domain Optical Networking", IETF Standard-Working-Draft, Internet Engineering Task Force, IETF, CH, No. 1, Jul. 2001, XP015037051 ISSN: 0000-0004.

J. Doyle; "Routing TCP/IP, vol. 1"; Macmillan Technical Publishing; 1998; pp. 176-181.

"User Network Interface (UNI) 1.0 Signaling Specification"; Oct. 1, 2001; pp. 1-113.

"Private Network-Network Interface Specification Version 1.1 (PNNI 1.1)"; Apr. 2002; pp. 13-35.

* cited by examiner

INTER-DOMAIN CONSTRAINT-BASED SHORTEST PATH FIRST TECHNIQUE FOR SUPPORTING HIERARCHICAL ROUTING IN INTERCONNECTED MULTI-DOMAIN OPTICAL TRANSPORT NETWORKS

CROSS-REFERENCE TO RELATED APPLICATION(S)

This application discloses subject matter related to the subject matter disclosed in commonly owned, co-pending U.S. patent application Ser. No. 10/320,286; Alcatel Reference No. 139059), entitled "A CONSTRAINT-BASED SHORTEST PATH FIRST METHOD FOR DYNAMICALLY SWITCHED OPTICAL TRANSPORT", filed Dec. 16, 2002, in the names of Fuming Wu and Frederick H. Skoog, which is hereby incorporated by reference in its entirety for all purposes.

BACKGROUND OF THE INVENTION

1. Technical Field of the Invention

The present invention generally relates to interconnected multi-domain optical transport networks ("OTNs"). More particularly, and not by way of any limitation, the present invention is directed to an inter-domain constraint-based shortest path first ("IrD-CSPF") technique for supporting hierarchical routing in such networks.

2. Description of Related Art

Conventional IP-centric inter-domain routing protocols use different technologies to optimize routes from a source address to a destination address. For example, Routing Information Protocol ("RIP") uses the Bellman-Ford algorithm to calculate the minimum number of hops from source to destination. Open Shortest Path First ("OSPF") and Intermediate System-to-Intermediate System ("IS-IS") protocols use Dijkstra's Shortest Path First ("SPF") algorithm to achieve a path with minimum cost, the measure of which is set by the network administrator. In Border Gateway Protocol ("BGP"), path selection is mainly influenced by policy attributes and local preference, while Interior Gateway Protocol ("IGP") metrics are not directly used.

Constraint-based routing in Generalized Multi-Protocol Label Switching ("GMPLS") control planes in OTNs is one of the main processes required for on-demand service provisioning (or bandwidth-on-demand) and for dynamic service restoration. In constraint-based routing, routing protocols calculate a path from a source to destination transport network element ("TNE") that is optimal and does not violate a given set of constraints. Route setup between the given source and destination TNEs takes place at the source TNE, whereas in conventional IP routing, a path or route is computed in a distributed fashion by every router in a network. In addition to resource utilization optimization, the focus of constraint-based routing is on optimization of performance and ease of administration.

Under the current heterogeneous multi-carrier and multi-vendor networking environment, an interconnected OTN may be partitioned into multiple domains. Typically, a domain is defined as a portion of the network that has a clear demarcation boundary based on technology, business, service, technical administration, or architectural function. Given an interconnected multi-domain OTN, a hierarchical routing structure can be created using a feeding-up procedure described in Chapter 3 of "Private Network-Network Interface Specification Version 1.1", ATM Forum af-pnni-0055.002, April 2002 (hereinafter "PNNI Version 1.1"). It is worth noting that, for multi-node domain with border node representation, a link aggregation technique is a key in constructing the next higher hierarchical level from the current hierarchical level.

A primary objective of routing over an interconnected multi-domain OTN is to map a source-to-destination traffic demand into the optimal sequence of sub-paths within each transit domain. Conventional routing protocols cannot perform the functionality of constraint based hierarchical routing in interconnected multi-domain OTNs. The autonomous systems in BGP and the areas in OSPF are required to be controlled by the same administrative entity of a single carrier. Moreover, routing in the aforementioned conventional inter-domain IP routing protocols is not based on the traffic engineering performance criteria and/or does not support the bandwidth-on-demand service requirement. Although traffic engineering ("TE") and GMPLS extensions existing for some of the conventional IP routing protocols (e.g., GMPLS OSPF-TE and GMPLS IS-IS TE), they are still not fit for hierarchical routing in interconnected multi-domain OTNs.

For example, GMPLS OSPF-TE (equipped with both an intra-domain ("IaD") CSPF procedure such as that described in U.S. patent application Ser. No. 10/320,286 entitled A CONSTRAINT-BASED SHORTEST PATH FIRST METHOD FOR DYNAMICALLY SWITCHED OPTICAL TRANSPORT (hereinafter "IaD-CSPF Patent Document", which has been incorporated by reference in its entirety, and a domain/link aggregation technique) has a limitation of two hierarchy levels, routing areas, and backbone areas. This solution is deficient, therefore, in cases in which a carrier requests to have more hierarchy levels according to the operation structures, technology, business, service, technical administration and/or architectural functions of its network(s).

All of the existing algorithms described above are aimed at the calculation of the optimal route or path for best-effort traffic demands. These algorithms do not support bandwidth-guaranteed services. Moreover, the IaD-CSPF technique described in the IaD-CSPF Patent Document is designed for path calculation for Soft Permanent Connection ("SPC") connection requests of intra-domain constraint-based routing in GMPLS OTNs.

SUMMARY OF THE INVENTION

Accordingly, the present invention advantageously provides method and system for implementing an inter-domain constraint-based shortest path first ("IrD-CSPF") technique for supporting hierarchical routing in interconnected multi-domain OTNs.

In one embodiment, the invention is a method for calculating a network path in an interconnected multi-domain network. The method comprises receiving a path setup request message for a new traffic flow in the network, wherein the path setup request message identifies a source node in one domain of the network and a destination node in a second domain of the network; determining a common ancestor hierarchical routing domain that includes ancestor nodes of both the source and destination nodes; calculating an inter-domain path from the ancestor node of the source node to the ancestor node of the destination node in the common ancestor hierarchical routing domain that determines, for each lower-level domain, border nodes in the domain from the source node to the destination node using a traffic engineering network database ("TEDB") that stores network topology information for the common ancestor hierarchical routing domain; and for each bottom-level domain, calculating an intra-domain path between the border nodes that were determined for the domain.

In another embodiment, the invention comprises a method for calculating a path through an interconnected multi-domain network responsive to receipt of a path setup request message, the path setup request message identifying a source node and a destination node, wherein the network can be represented by an hierarchical routing structure comprising a bottom level and at least one upper level. The method comprises determining whether the source and destination nodes are in a common bottom level domain; if the source and destination nodes are not in a common bottom level domain, determining a common ancestor hierarchical routing domain that includes ancestor nodes of both the source and destination nodes; calculating an inter-domain path from the ancestor node of the source node to the ancestor node of the destination node in the common ancestor hierarchical routing domain, wherein the inter-domain path specifies, for each immediately lower-level domain, border nodes in the domain along a path from the source node to the destination node; and for each bottom-level domain, calculating an intra-domain path between the border nodes that were determined for the domain.

In another embodiment, the invention comprises a system for calculating a network path in an interconnected multi-domain network. The system comprises means for receiving a path setup request message for a new traffic flow in the network, wherein the path setup request message identifies a source node in one domain of the network and a destination node in a second domain of the network; means for determining a common ancestor hierarchical routing domain that includes ancestor nodes of both the source and destination nodes; means for calculating an inter-domain path from the ancestor node of the source node to the ancestor node of the destination node in the common ancestor hierarchical routing domain that determines, for each lower-level domain, border nodes in the domain from the source node to the destination node using a traffic engineering network database ("TEDB") that stores network topology information for the common ancestor hierarchical routing domain; and means for calculating an intra-domain path between the border nodes that were determined for each bottom-level domain.

In yet another embodiment, the invention comprises an apparatus for calculating a network path in an interconnected multi-domain network representable by a hierarchical routing structure comprising a bottom hierarchical level and at least one upper hierarchical level. The apparatus comprises a routing controller ("RC") located at a domain of each upper hierarchical level; a Traffic Engineering Database ("TEDB") associated with each RC; a Domain Information Database ("DIDB") associated with each RC; and an inter-domain Constraint Based Shortest Path First ("IrD-CSPF") procedure for calculating an inter-domain path from an ancestor node of a source node identified in a path setup request message to an ancestor node of a destination node identified in the path setup request message, wherein the ancestor nodes are located in a lowest common ancestor hierarchy domain of the identified source and destination nodes.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

In the drawings, like or similar elements are designated with identical reference numerals throughout the several views thereof, and the various elements depicted are not necessarily drawn to scale.

Figure 1:
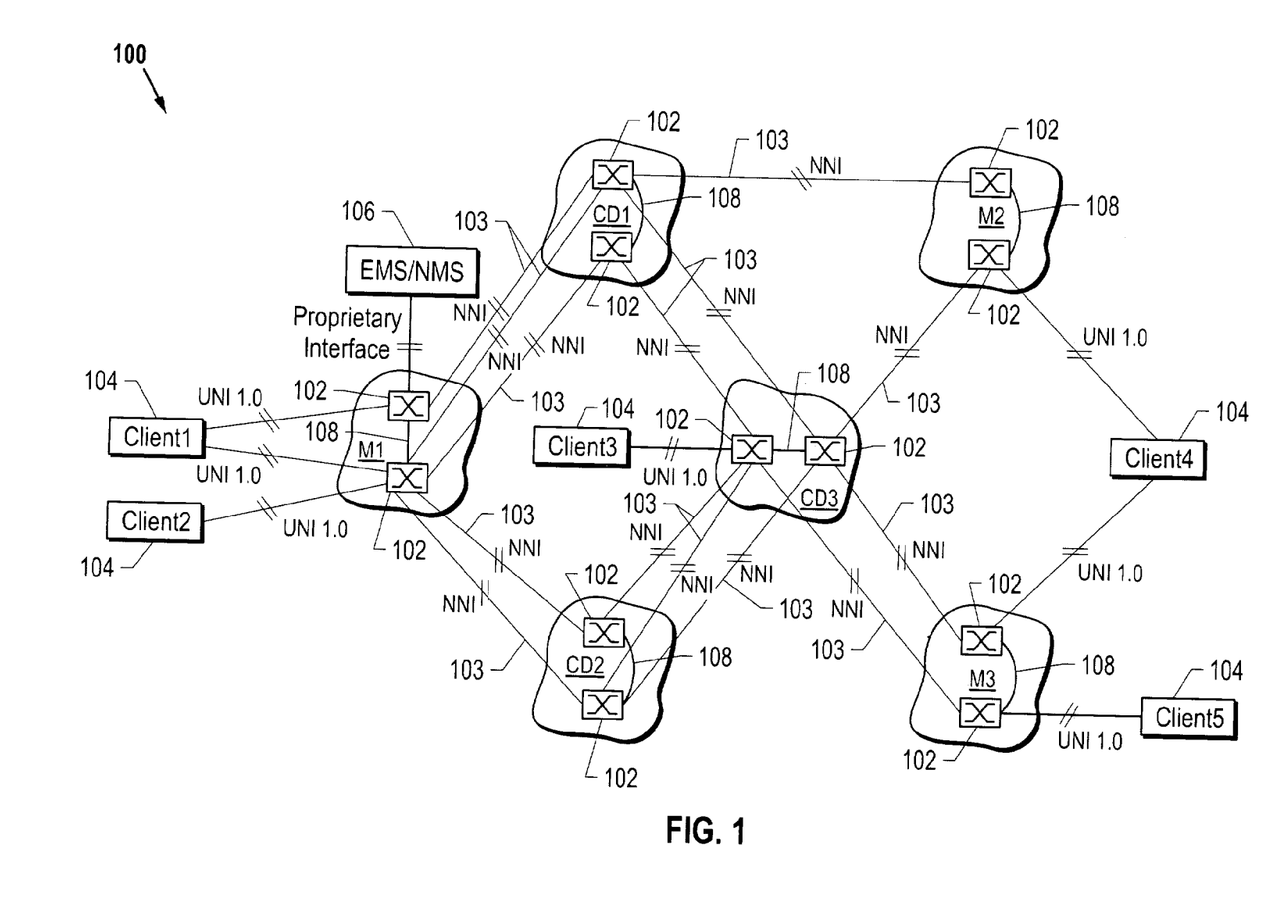
FIG. 1 illustrates an interconnected multi-domain OTN in accordance with one embodiment.

FIG. 1 illustrates an interconnected multi-domain OTN 100 in accordance with one embodiment. As shown in FIG. 1, the OTN 100 includes a plurality of domains, or areas, respectively designated CD1, CD2, CD3, M1, M2, and M3. Each of the domains CD1–CD3, M1–M3, includes a plurality of nodes, or routers, 102 each of which may be connected to a node in another one of the domains via an inter-domain link ("IrD link") 103 through a Network-to-Network interface ("NNI") and to one or more clients 104 via a User-to-Network interface ("UNI 1.0"). Additionally, a node 102 may be connected to a management agent 106, such as a Craft Interface Terminal ("CIT"), an Element Management System ("EMS"), or a Network Management System ("NMS"), via a proprietary interface. Nodes 102 within the same domain may be interconnected via intra-domain links ("IaD links") 108.

As will be described in greater detail below, one embodiment of an Inter-Domain CSPF ("IrD-CSPF") technique supports both Switched Connection ("SC") requests, which are initiated over a UNI signaling interface, and Soft Permanent Connection ("SPC") requests, which are initiated through a management agent, such as the management agent 106, with a wide set of constraints.

Figure 2:
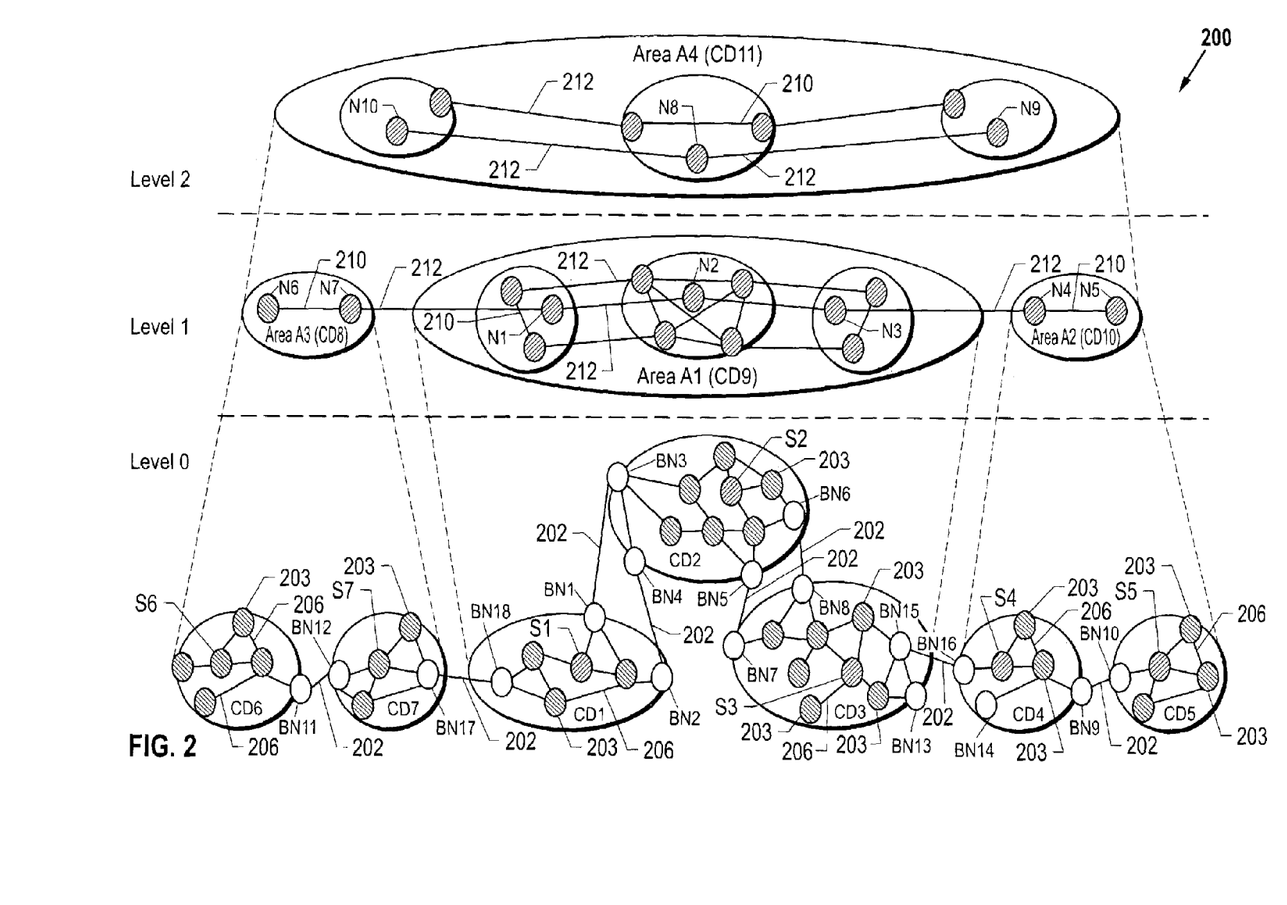
FIG. 2 illustrates a hierarchical routing structure representation of an interconnected multi-domain OTN in accordance with one embodiment.

As previously noted, given an interconnected multi-domain OTN, such as the OTN 100, a hierarchical routing structure representation can be created using a "feeding up" procedure. FIG. 2 illustrates a hierarchical routing structure 200 of an interconnected multi-domain OTN. Level 0 of the structure 200 represents the actual physical OTN. A plurality of routing domains CD1–CD7 are defined and each include one or more border nodes BN1–BN18. The domains CD1–CD7 may be interconnected via IrD links 202 between a pair of border nodes BN1–BN18 located in different domains. Internal nodes, represented by nodes 203, located within each of the domains CD1–CD7 may be connected to other internal nodes 203 or border nodes BN1–BN18 within the same domain via IaD links 206.

Additionally, each of the routing domains CD1–CD7 includes a controlling node S1–S7, respectively. Each controlling node S1–S7 includes a routing controller ("RC")

(not shown in FIG. 2), which will be described in greater detail below with reference to FIG. 3.

Level 1 is an abstraction of Level 0. In particular, the physical domains CD6 and CD7 are represented in Level 1 by a single abstract domain CD8. Similarly, the physical domains CD1–CD3 are represented in Level 1 by an abstract domain CD9 and the physical domains CD4 and CD5 are represented in Level 1 by an abstract domain CD 10. The controlling nodes S1–S7 are represented in Level 1 by abstract nodes N1–N7, respectively. It will be noted that in Level 1, nodes N1, N4 and N7 are controlling nodes; the remaining nodes are border nodes.

Level 2 is an abstraction of Level 1. In particular, the abstract domains CD8–CD10 are represented in Level 2 by a single abstract domain CD11. The three controlling nodes N1–N3 have been collapsed into a single controlling node N8. The abstract controlling nodes N4 and N7 are represented in Level 2 by abstract controlling nodes N9 and N10, respectively. The remaining nodes of Level 2 are border nodes. A pair of nodes within the same upper-level 2 domain (e.g., nodes N6 and N7), are interconnected via an abstract IaD link 210. A pair of nodes of different upper-level domains (e.g., nodes N3 and N4) are interconnected via an abstract IrD link 212.

Figure 3:
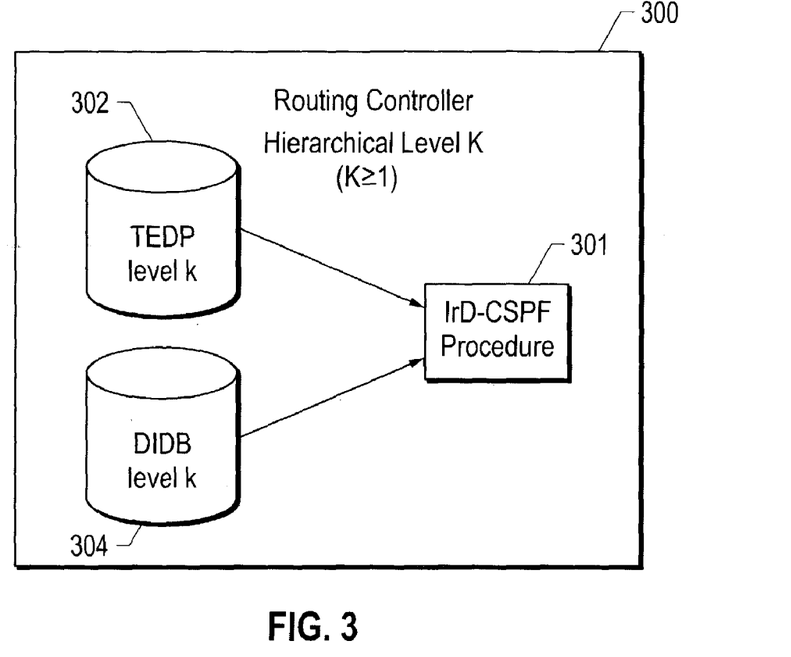
FIG. 3 is a block diagram of a routing controller of an upper hierarchical level of the routing structure of FIG. 2.

Referring to FIG. 3, and as will be described in greater detail hereinbelow, within each RC 300 in each of the controlling nodes of each hierarchical Level k, where k>0, an embodiment of an IrD-CSPF procedure 301 utilizes the contents of two types of databases, including a Traffic Engineering Database ("TEDB") 302 and a Domain Information Databases ("DIDB") 304. The following briefly describes the creation and maintenance mechanisms of the databases 302 and 304.

Construction of the TEDBs 302 and DIDBs 304 is a bottom-up procedure. Referring to FIGS. 2 and 3, within each domain CD1–CD7 of the bottom-tier (i.e., Level 0) of the represented network, a domain-specific intra-domain routing protocol entity (not shown), with appropriate extensions for TE, is hired and runs. This intra-domain routing entity is responsible for the discovery, maintenance, and advertisement of local topology and local resource availability (e.g., intra-domain TE links) within the respective domain. For the controlling node S1–S7 of each individual domain CD1–CD7, respectively, of the bottom tier, an RC is selected or appointed by the network operator with a global unique identifier "RC Id", which is advertised in the local domain. The RC is capable of identifying local border nodes, local inter-domain TE links, and local reachability information (i.e., the local reachable TNA addresses). The RC is also capable of aggregating the topology, e.g., via link aggregation, of its local domain.

Each Level 0 RC, representing its own underlying domain, joins the next higher hierarchical level (i.e., Level 1) domain thereof, in which an inter-domain routing protocol entity is hired. The RC of this next higher level hierarchical routing domain, which are represented by the RC 300 of FIG. 3, exchange with each other the routing-related information, such as the local border nodes, the local inter-domain TE links, the local abstract inter-domain links and the local reachability information, of their underlying (in this case, Level 0) domains.

Each RC 300 of the controlling nodes N1, N4 and N7 of the Level 1 domains (CD8–CD10) creates a local TEDB 302 for recording all of the routing-related information and a local DIDB 304 for recording the reachability and other domain-related information. This process (i.e., the hiring of an inter-domain routing protocol entity in the next higher hierarchical level and the exchanging of information between the RCs of that level) is performed repeatedly, in a bottom-to-top fashion, until the top-level hierarchical routing domain is reached. In FIG. 2, this top level hierarchical routing domain is the domain CD11 in Level 2.

It will be appreciated that the inter-domain routing protocol entity running in RC 300 is separately treated from the inter-domain and the intra-domain routing entity running in its represented underlying domain.

As shown in FIG. 2, the Level 0 domains CD6 and CD7 are abstracted to the domain CD8 in Level 1, which is in turn abstracted to the domain CD11 in Level 2. Accordingly, domains CD8 and CD11 are "ancestor domains" of domains CD6 and CD7 and each node of the domains CD6 and CD7 is represented in each of the domains CD8 and CD11 by an "ancestor node." Similarly, the Level 0 domains CD1–CD3 are abstracted to the domain CD9 in Level 1, which is in turn abstracted to the domain CD11 in Level 2. Accordingly, domains CD9 and CD11 are ancestor domains of CD1–CD3 and each node of the domains CD1–CD3 is represented in each of the domains CD9 and CD11 by an ancestor node. Finally, the domains CD4 and CD5 are abstracted to the domain CD10 in Level 1, which is in turn abstracted to the domain CD11 in Level 2. Accordingly, domains CD10 and CD11 are ancestor domains of CD 4 and CD5 and each node in the domains CD4 and CD5 is represented in each of the domains CD 10 and CD11 by an ancestor node.

As previously indicated, the IrD-CSPF procedure 301 relies on the TEDB 302, which includes the attributes of all of the inter-domain and abstract intra-domain links, and the DIDB 304, which includes the domain-related information, such as the reachability of the up-level routing domain on which the IrD-CSPF procedure 301 operates. Generally, the limitations are always on the side of the databases 302, 304, due to some technical reasons, e.g., the IrD and the IaD routing protocols being used cannot provide a complete set of link attributes or the optical network equipment in the network lacks the necessary technologies for supporting certain traffic attributes.

The primary objective of routing over a multi-domain interconnected OTN is to map a source-to-destination traffic demand into the optimal sequence of sub-paths within each domain. This routing functionality can be achieved by an alignment of an embodiment of the IrD-CSPF procedure described herein that is responsible for calculating the optimal path in the relevant upper-level domains in a top-down manner between two nodes that are in different Level 0 domains (starting from the lowest common ancestor hierarchical domain of the source node and the destination node) and the IaD-CSPF procedure, which calculates the ER in the Level 0 domains. In general, the cost of an IaD abstract link in the current hierarchical level domain between a pair of nodes (note that these two nodes must be border nodes in a next lower hierarchical level domain, which is a multi-node domain with border node representation) may not be the cost of the optimal path between the same node pair in this next lower hierarchical level domain.

An embodiment of the IrD-CSPF procedure described herein is designed to support the calculation of an IrD ER for both Soft Permanent Connection ("SPC") and Soft Connection ("SC") traffic demands. By definition, an SPC traffic demand is initiated through a management agent, such as a Craft Interface Terminal ("CIT"), an Element Management System ("EMS"), or a Network Management System ("NMS"), while an SC traffic demand is initiated over a UNI signaling interface. Accordingly, besides the specific traffic attribute constraints, an SPC request must include the identifiers of the source and destination nodes, while an SC request must include the source and destination Transport Network Assigned ("TNA") addresses.

Figure 4:
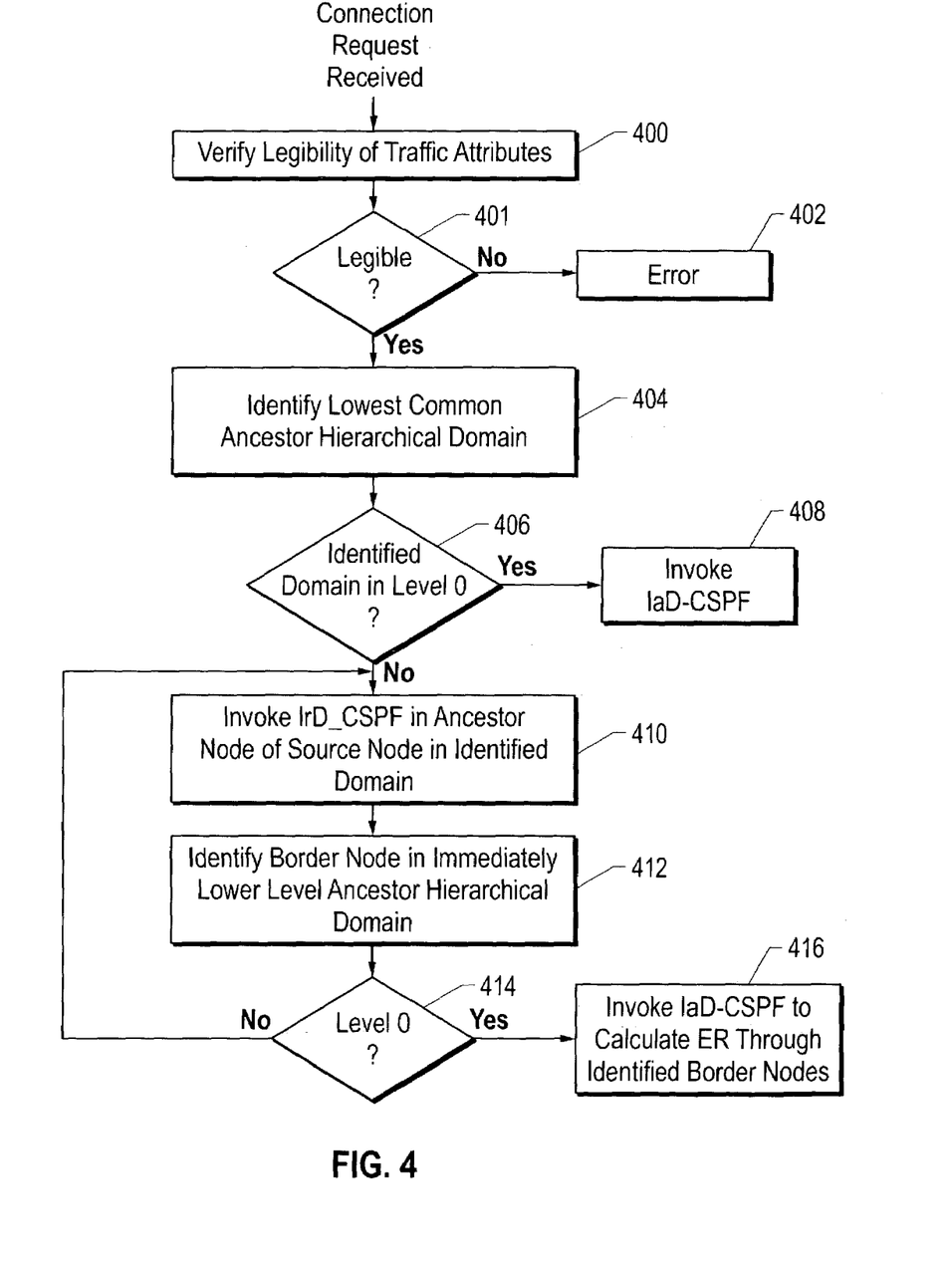
FIG. 4 is a flowchart of a path selection procedure in accordance with one embodiment.

FIG. 4 is a flowchart of an embodiment of the path selection procedure given the hierarchical routing structure of an interconnected OTN. Specifically, FIG. 4 illustrates the path selection procedure for an SPC connection request (or traffic demand). In step 400, responsive to an SPC request, a path selection component running in the node that receives the request (i.e., the source node) verifies the legibility of the traffic attributes included in the request. A determination is made in step 401 whether legibility was verified. If the traffic attributes are not legible, an error is generated in step 402; otherwise, in step 404, the lowest common ancestor hierarchical routing domain of the source and destination nodes is identified in a bottom-up manner.

Figure 5:
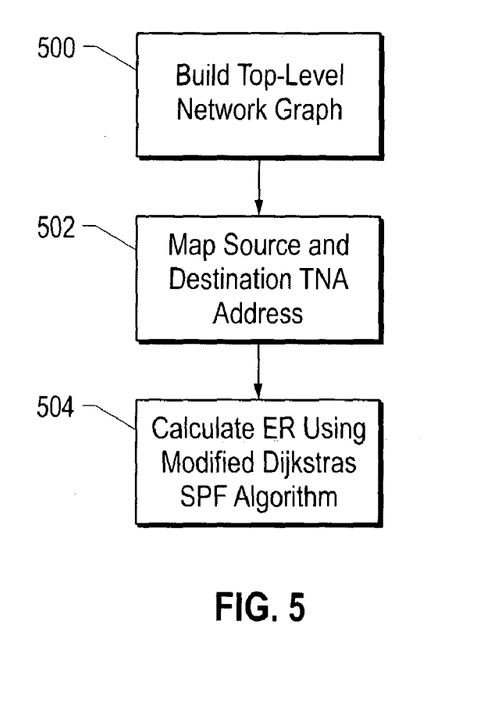
FIG. 5 is a flowchart of an IrD-CSPF procedure in accordance with one embodiment.

In step 406, a determination is made whether both the source and the destination nodes are in the same bottom-tier, or "Level 0", domain. If so, in step 408, the ER calculation is performed inside the identified Level 0 domain by invoking the IaD-CSPF procedure described in the IaD-CSPF Patent Document referenced above. Otherwise, (i.e., if the source and destination nodes are not located in the same Level 0 domain), in step 410, the IrD-CSPF procedure, which is described in greater detail with reference to FIG. 5, is performed in the ancestor node of the source node in the identified upper-level domain.

The result of step 410 is an inter-domain ER at the identified upper-level that comprises an ordered sequence of abstract inter-domain links and/or abstract intra-domain links. In step 412, a border node is identified in the immediately lower level hierarchical routing domain that is also an ancestor domain of the domain of the source node based on the information provided as a result of step 410. If the lower level hierarchical domain identified in step 412 is not in the bottom tier (Level 0) of the hierarchy, as determined in step 414, execution returns to step 410 and the IrD-CSPF procedure is performed on the ancestor node in this identified ancestor domain of the source node in calculating the ER toward the identified border node. Otherwise, execution proceeds to step 416, in which the IaD-CSPF is invoked in the Level 0 domains to calculate the ER through the border nodes identified by the IrD-CSPF.

It will be appreciated that the path selection procedure for an SC request is identical to that described in FIG. 4 with respect to an SPC request, except that for an SC connection request, after verifying the legibility of the traffic attributes included in the request, the path selection component running in the source node of the SC connection request searches the local DIDB, which includes the domain relevant information, such as domain switching capability, domain shared risk group, and domain reachability information for the bottom-tier domain, and makes sure that the node hosts the source TNA address is exactly the source node of the SC connection request (note that a node is identified by the pair <routing controller identifier, node address>).

Additionally, in step 404, the path selection component identifies the lowest common ancestor routing domain of the source and the destination TNA addresses in the hierarchical structure of the network and maps these TNA addresses to the identifiers of nodes (in the identified common ancestor domain) that host these TNA addresses, respectively. It will be appreciated that the lookup procedure of the TNA addresses uses the longest prefix matching method, as the TNA addresses may be maintained in the DIDBs in sum-marization formats. The remainder of the path selection procedure is the same as that for an SPC connection request as described above.

The main features of the IrD-CSPF procedure are:
1. Connection Types: SPC and SC;
2. Directionality: unidirectional signaled connection and bidirectional singled connection
3. Link Interface Identifier Types: unnumbered (unsigned integer index) and numbered (Ipv4 address);
4. Diversities: the requested ER can be SRLG, node, or link diverse with an existing ER;
5. Protection Types: AnyType, which is a customer defined protection type indicating that the requester does not care about the protection type of the ER hops), unprotected, protected (dedicated 1:1 and dedicated 1+1), and enhanced link.
6. Reachability: UNI connection endpoints are identified by TNA addresses. Each TNA address is a global unique address assigned by the OTN to a TE link connecting a TNE and a client. The IrD-CSPF supports Ipv4 TNA addresses for both flat and summarization formats;
7. Encoding Type: SONET/SDH, Lambda and Fiber
8. Switching Type: TDM, LSC, and FSC;
9. Concatenation: single type standard concatenation of elementary signaling types.

Assuming that a given interconnected multi-domain OTN has two hierarchical levels (i.e., a top level ("Level 1") and a bottom level ("Level 0"))), the IrD-CSPF can be described as comprising three functional steps, as illustrated in FIG. 5. In step 500, the top-level network graph is constructed. In step 502, the source and destination TNA addresses are mapped. In step 504, the ER is calculated using a modified Dijkstra's SPF algorithm. Each of steps 500-504 will be described in greater detail below.

The step of building the top-level network graph (step 500) will be described in greater detail. The step 500 uses as inputs the TEDB 302, Connection Traffic Attributes ("CTAs") (switching type, encoding type, elementary signaling type, and number to be concatenated), Service Level ("SL") (connection protection type), and Diversity (the link/node/SRLG set for an existing ER). The output is the Network Graph ("dGraph") and an Error Code ("errorCode"). In this step, the IrD-CSPF verifies the given Connection Traffic Attributes and Service Level and, based on the verified CTAs and SL and the Diversity information, creates the Network Graph or an Error Code.

Exemplary pseudocode for implementing step 500 is set forth below:

```
if one of the CTAs or the SL is illegal
    then errorCode←the corresponding error code
else
    for each link ∈ TEDB
        do  insert the link to the dGraph if it matches
            the CTAs, the SL, and satisfies the
            Diversity requirement and it is the lowest
            cost link in which case it will overwrite
            any higher cost entry
    return dGraph, errorCode
```

The step of mapping the source and destination TNA addresses (step 502, FIG. 5) will be now described in greater detail. This step uses as inputs the DIDB 304, the Network Graph (dGraph), the Source TNA Address ("srcTNA"), and the Destination TNA Address ("dstTNA"). In this step, the IrD-CSPF verifies the given source and destination TNA addresses (which are included in an SC connection request) and maps them to an <srcRCId, srcNodeAddr> list and an <dstRCId, dstNodeAddr> list, respectively. When verifying the Source and Destination TNA addresses, based on the contents of the DIDB, the IrD-CSPF maps them to the <sRCId, sNodeAddr> pair and the <dRCId, dNodeAddr> pair, respectively.

Exemplary pseudocode for carrying out this portion of step 502 is set forth below:

```
if srcTNA ∈ DIDB (longest prefix matching)
    then <sRCId, sNodeAddr> ←retrieving RC Id and Node
        address of srcTNA (from DIDB)
        if dstTNA ∈ DIDB (longest prefix matching)
            then <dRCId,dNodeAddr> ←retrieving RC Id
                and Node address of dstTNA (from DIDB)
            else errorCode ←the corresponding error code
    else errorCode ←the corresponding error code
    return <sRCId, sNodeAddr>, <dRCId, dNodeAddr>, errorCode
```

Unfortunately, the <sRCId, sNodeAddr> pair and the <dRCId, dNodeAddr> pair may not occur in the dGraph. For example, For security considerations, the RC in a certain domain may hide the address of the node that hosts a TNA at the time it is advertising the TNA. If this is the case, the following procedure, illustrated in pseudocode, may be applied to solve this problem:

```
if <sRCId, sNodeAddr> ∈dGraph
    then search dGraph, retrieve all of the pairs <RCId,
        NodeAddr> with RCId=sRCId and append these pairs
        to the <srcRCId, srcNodeAddr> list
    else <srcRDId, srcNodeAddr> list ←<sRCId, sNodeAddr>
if <dRCId, dNodeAddr> ∈dGraph
    then search dGraph, retrieve all of the pairs <RCId,
        NodeAddr> with RCId=dRCId and append these pairs
        to the <dstRCId, dstNodeAddr> list
    else <dstRDId, dstNodeAddr> list ←<dRCId, dNodeAddr>
    return <sRCId, sNodeAddr>, <dRCId, dNodeAddr>, errorCode
```

The step of calculating the ER using a modified Dijkstra's SPF algorithm (step 504, FIG. 5) will be now described in greater detail. This step uses as inputs the Network Graph (dGraph), the <srcRCId, srcNodeAddr> list and the <dstRCId, dstNodeAddr> list. In step 504, between a specific combination (<srcRCId, srcNodeAddr>, <dstRCId, dstNodeAddr>), a modified Dijkstra's SPF algorithm is applied so that the computation is terminated as soon as the <dstRCId, dstNodeAddr> is reached, so as to achieve a better performance. This step may achieve the optimal ER in the network. The resultER is defined as the cheapest ER among the optimal ERs achieved for all possible combinations of (<srcRCId, srcNodeAddr>, <dstRCId, dstNodeAddr>) for the <srcRCId, srcNodeAddr> list and the <dstRCId, dstNodeAddr> list.

Exemplary pseudocode For performing step 504 is set forth below:

```
resultER ←NIL
cost (resultER) ←∞
for each <sRCId, sNodeAddr> ∈ <srcRCId, srcNodeAddr> list
    for each <dRCId, dNodeAddr> ∈ <dstRCId, dstNodeAddr> list
        do  tempER ←the optimal ER calculated b the
            modified Dijkstra's SPF algorithm for the
            combination (<sRCId, sNodeAddr>, <dRCId,
            dNodeAddr>)
            if cost(tempER) < cost(resultER)
                then resultER ←tempER
return resultER
```

Figure 6:
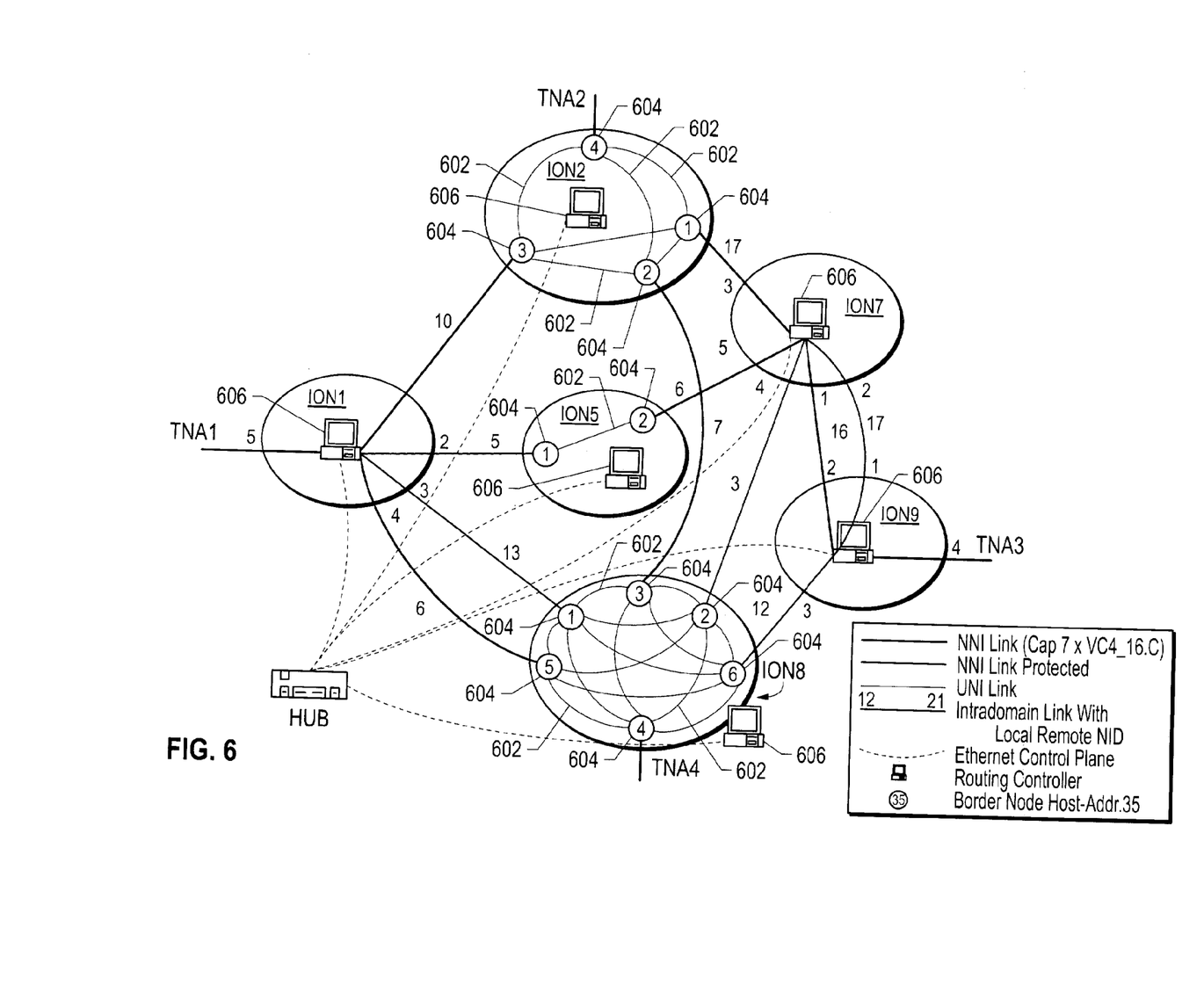
FIG. 6 illustrates an exemplary interconnected multi-domain OTN for demonstrating the performance of one embodiment.

An example of IrD path calculation using the IrD-CSPF procedure will now be provided. Given an interconnected multi-domain OTN with a two-level hierarchical structure, the domain representation of the network is depicted in FIG. 6.

There are two different approaches for the summarization of IaD routing information. For the sake of completeness, both of these are covered in this example, and shown in FIG. 6, which depicts an interconnected multi-domain OTN 600. Domains ION2, ION5, and ION8 are examples of domains in which abstract IaD links, represented by links 602, are advertised by an IrD routing protocol for each pair of border nodes 604 within a single domain. Domains ION1, ION7, and ION9 are examples of domains with a single routing node 606 that is the RC in each single domain. At the top-level (or "IrD level"), the IrD adjacencies are configured between ION1 & ION2, ION1 & ION5, ION1 & ION8, ION2 & ION7, ION2 & ION8, ION6 & ION7, ION7 & ION8, IOON7 & ION9 and ION8 & ION9.

It will be assumed that the addresses of the RCs 606 are assigned in the following manner. For domain IONx, the RC identifier is with the address (RCId) 192.168.20.x and the border nodes' addresses in a routing domain IONx are assigned as xx.xx.xx.1, xx.xx.xx.2, and so on. For example, in routing domain ION2, the four border nodes addresses are 22.22.22.1, 22.22.22.2, 22.22.22.3, and 22.22.22.4, respectively. Finally, the reachable addresses are TNA1=19.19.19.1, TNA2=29.29.29.0/24 (summarization format), TNA3=39.39.39.1, and TNA4=49.49.49.1. For simplicity, only domains ION1 and ION2 will be considered and it will be assumed that the current domain is TON1.

The TEDB of each RC 606 includes the following link state information:

```
A. One inter-domain link (advertized by routing controller
    192.168.20.1)
    srcRCId:              192.168.20.1
    srcNodeAddr:          192.168.20.1
    localIfId:            1
    remoteIfId:           3
    destRCId:             192.168.20.2
    destNodeAddr:         22.22.22.3
    protection type:      unprotected
    cost:                 5
    switch capability:    TDM
    signaling type:       STS-48c/VC4-16c
    time slots:           10
    SRLG IDs:             15, 25
B. One inter-domain link (advertized by routing controller
    192.168.20.2)
    srcRCId:              192.168.20.2
    srcNodeAddr:          22.22.22.3
    localIfId:            3
    remoteIfId:           1
    destRCId:             192.168.20.1
    destNodeAddr:         192.168.20.1
    protection type:      unprotected
    cost:                 5
```

-continued

```
          switch capability:    TDM
          signaling type:       STS-48c/VC4-16c
          time slots:           10
          SRLG IDs:             15, 25
     C. 12 abstract intra-domain links (advertised by routing
        controller 192.168.20.2)
link 1    srcRCId:              192.168.20.2
          srcNodeAddr:          22.22.22.3
          localIfId:            34
          remoteIfId:           43
          destRCId:             192.168.20.2
          destNodeAddr:         22.22.22.4
          protection type:      unprotected
          cost:                 15
          switch capability:    TDM
          signaling type:       STS-48c/VC4-16c
          time slots:           3
          SRLG IDs:             35, 45
link 2    srcRCId:              192.168.20.2
          srcNodeAddr:          22.22.22.4
          localIfId:            43
          remoteIfId:           34
          destRCId:             192.168.20.2
          destNodeAddr:         22.22.22.3
          protection type:      unprotected
          cost:                 15
          switch capability:    TDM
          signaling type:       STS-48c/VC4-16c
          time slots:           3
          SRLG IDs:             35, 45
link 3    srcRCId:              192.168.20.2
          srcNodeAddr:          22.22.22.3
          localIfId:            31
          remoteIfId:           13
          destRCId:             192.168.20.2
          destNodeAddr:         22.22.22.1
          protection type:      unprotected
          cost:                 3
          switch capability:    TDM
          signaling type:       STS-48c/VC4-16c
          time slots:           5
          SRLG IDs:             55, 65
link 4    srcRCId:              192.168.20.2
          srcNodeAddr:          22.22.22.1
          localIfId:            13
          remoteIfId:           31
          destRCId:             192.168.20.2
          destNodeAddr:         22.22.22.3
          protection type:      unprotected
          cost:                 3
          switch capability:    TDM
          signaling type:       STS-48c/VC4-16c
          time slots:           5
          SRLG IDs:             55, 65
link 5    srcRCId:              192.168.20.2
          srcNodeAddr:          22.22.22.3
          localIfId:            32
          remoteIfId:           23
          destRCId:             192.168.20.2
          destNodeAddr:         22.22.22.2
          protection type:      unprotected
          cost:                 4
          switch capability:    TDM
          signaling type:       STS-48c/VC4-16c
          time slots:           10
          SRLG IDs:             75, 85
link 6    srcRCId:              192.168.20.2
          srcNodeAddr:          22.22.22.2
          localIfId:            23
          remoteIfId:           32
          destRCId:             192.168.20.2
          destNodeAddr:         22.22.22.3
          protection type:      unprotected
          cost:                 4
          switch capability:    TDM
          signaling type:       STS-48c/VC4-16c
          time slots:           10
          SRLG IDs:             75, 85
link 7    srcRCId:              192.168.20.2
          srcNodeAddr:          22.22.22.1
          localIfId:            12
          remoteIfId:           21
          destRCId:             192.168.20.2
          destNodeAddr:         22.22.22.2
          protection type:      unprotected
          cost:                 2
          switch capability:    TDM
          signaling type:       STS-48c/VC4-16c
          time slots:           5
          SRLG IDs:             95, 105
link 8    srcRCId:              192.168.20.2
          srcNodeAddr:          22.22.22.2
          localIfId:            21
          remoteIfId:           12
          destRCId:             192.168.20.2
          destNodeAddr:         22.22.22.1
          protection type:      unprotected
          cost:                 2
          switch capability:    TDM
          signaling type:       STS-48c/VC4-16c
          time slots:           5
          SRLG IDs:             95, 105
link 9    srcRCId:              192.168.20.2
          srcNodeAddr:          22.22.22.1
          localIfId:            14
          remoteIfId:           41
          destRCId:             192.168.20.2
          destNodeAddr:         22.22.22.4
          protection type:      unprotected
          cost:                 1
          switch capability:    TDM
          signaling type:       STS-48c/VC4-16c
          time slots:           8
          SRLG IDs:             115, 125
link 10   srcRCId:              192.168.20.2
          srcNodeAddr:          22.22.22.4
          localIfId:            41
          remoteIfId:           14
          destRCId:             192.168.20.2
          destNodeAddr:         22.22.22.1
          protection type:      unprotected
          cost:                 1
          switch capability:    TDM
          signaling type:       STS-48c/VC4-16c
          time slots:           8
          SRLG IDs:             115, 125
link 11   srcRCId:              192.168.20.2
          srcNodeAddr:          22.22.22.2
          localIfId:            24
          remoteIfId:           42
          destRCId:             192.168.20.2
          destNodeAddr:         22.22.22.4
          protection type:      unprotected
          cost:                 1
          switch capability:    TDM
          signaling type:       STS-48c/VC4-16c
          time slots:           4
          SRLG IDs:             135, 145
link 12   srcRCId:              192.168.20.2
          srcNodeAddr:          22.22.22.4
          localIfId:            42
          remoteIfId:           24
          destRCId:             192.168.20.2
          destNodeAddr:         22.22.22.2
          protection type:      unprotected
          cost:                 1
          switch capability:    TDM
          signaling type:       STS-48c/VC4-16c
          time slots:           4
          SRLG IDs:             135, 145
```

The DIDB of each RC 606 includes the following reachability information:

| TNA1 | TNA Address: | 19.19.19.1 |
| | RCId: | 192.168.20.1 |
| | Host Node Addr: | 192.168.20.1 |
| TNA2 | TNA Address: | 29.29.29.0/24 |
| | RCId: | 192.168.20.2 |
| | Host Node Addr: | 22.22.22.4 |

Assuming that an SC or SPC can be requested by the following interface:

```
typedef struct calc_path_req{
    ipa                   srcTnaAddr;
    ipa                   dstTnaAddr;
    ipa                   srcRC;
    ipa                   srcNode;
    ipa                   dstRC;
    ipa                   dstNode;
    switch_capability     switchingType;
    encoding_type         IspEncodingType;
    ElementaryType        elementaryType
    concatenationType     concatenationType
    unsigned int          numberOfConcatenation;
    DirectionType         directionality;
    Protection Type       protectionType;
    NODE                  *nodeSet;
    LINK                  *linkSet;
    SRLG                  *slrgSet;
}CalcPathReq;
```

The following are the results of two sample runs:

```
1. SC Request
[Connection Request]
    srcTnaAddr:              19.19.19.1
    dstTnaAddr:              29.29.29.4
    srcRC:                   0
    srcNode:                 0
    dstRC:                   0
    dstNode:                 0
    switchingType:           TDM
    IspEncodingType:         SONET_SDH
    elementaryType:          STS3cSPE_VC4
    concatenationType:       concatenation_standard
    numberOfConcatenation:   16
    directionality:          Bidirectional
    protectionType:          unprotected
    nodeSet:                 Null
    linkSet:                 Null
    srlgSet:                 Null
```

```
[Execution Request]
    Calculation Time: 454 × 10⁻⁶ seconds.
    CalcStatus = 0
    Result ER:
        global cost = 9
    Hop 1    LocalRCAddr:      192.168.20.1
             LocalNodeAddr:    192.168.20.1
             outIfId:          1
             RemoteRCAddr:     192.168.20.2
             RemoteNodeAddr:   22.22.22.3
             InIfId:           3
             SrlgIds:          {15, 25}
    Hop 2    LocalRCAddr:      192.168.20.2
             LocalNodeAddr:    22.22.22.3
             outIfId:          31
             RemoteRCAddr:     192.168.20.2
```

```
             RemoteNodeAddr:   22.22.22.1
             InIfId:           13
             SrlgIds:          {55, 65}
    Hop 3    LocalRCAddr:      192.168.20.2
             LocalNodeAddr:    22.22.22.1
             outIfId:          14
             RemoteRCAddr:     192.168.20.2
             RemoteNodeAddr:   22.22.22.4
             InIfId:           41
             SrlgIds:          {135, 145}
```

```
2. SPC Request
[Connection Request]
    srcTnaAddr:              0
    dstTnaAddr:              0
    srcRC:                   192.168.20.1
    srcNode:                 192.168.20.1
    dstRC:                   192.168.20.2
    dstNode:                 22.22.22.1
    switchingType:           TDM
    IspEncodingType:         SONET_SDH
    elementaryType:          STS3cSPE_VC4
    concatenationType:       concatenation_standard
    numberOfConcatenation:   16
    directionality:          Bidirectional
    protectionType:          unprotected
    nodeSet:                 Null
    linkSet:                 Null
    srlgSet:                 Null
```

```
[Execution Request]
    Calculation Time: 405 × 10⁻⁶ seconds.
    CalcStatus = 0
    Result ER:
        global cost = 8
    Hop 1    LocalRCAddr:      192.168.20.1
             LocalNodeAddr:    192.168.20.1
             outIfId:          1
             RemoteRCAddr:     192.168.20.2
             RemoteNodeAddr:   22.22.22.3
             InIfId:           3
             SrlgIds:          {15, 25}
    Hop 2    LocalRCAddr:      192.168.20.2
             LocalNodeAddr:    22.22.22.3
             outIfId:          31
             RemoteRCAddr:     192.168.20.2
             RemoteNodeAddr:   22.22.22.1
             InIfId:           13
             SrlgIds:          {55, 65}
```

Based upon the foregoing Detailed Description, it should be readily apparent that the present invention advantageously provides a method and system for implementing an inter-domain constraint-based shortest path first ("IrD-CSPF") technique for supporting hierarchical routing in interconnected multi-domain OTNs.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A method for calculating a network path in an interconnected multi-domain network, the method comprising:
receiving a path setup request message for a new traffic flow in the network, wherein the path setup request message identifies a source node in one domain of the network and a destination node in a second domain of the network;
determining a common ancestor hierarchical routing domain that includes ancestor nodes of both the source and destination nodes;
calculating an inter-domain path from the ancestor node of the source node to the ancestor node of the destination node in the common ancestor hierarchical routing domain that determines, for each lower-level domain, border nodes in the domain from the source node to the destination node using a traffic engineering network database ("TEDB") that stores network topology information for the common ancestor hierarchical routing domain; and
for each bottom-level domain, calculating an intra-domain path between the border nodes that were determined for the domain.

2. The method of claim 1 wherein the determining is performed in a bottom-up manner.

3. The method of claim 1 wherein the determining comprises determining a lowest common ancestor hierarchical routing domain that includes the ancestor node of the source node and the ancestor node of the destination node.

4. The method of claim 1 wherein the path setup request message comprises a Soft Permanent Connection ("SPC") request.

5. The method of claim 1 wherein the connection request comprises a Switched Connection ("SC") request.

6. The method of claim 5 further comprising searching a local Domain Information Database ("DIDB") to confirm that a node that hosts a source TNA address is the source node.

7. The method of claim 1 wherein the inter-domain path is calculated using an Inter-Domain Constraint-Based Shortest Path First ("IrD-CSPF") procedure.

8. The method of claim 1 wherein the intra-domain path is calculated using an Intra-Domain CSPF ("IaD-CSPF") procedure.

9. The method of claim 1 further comprising verifying legibility of traffic attributes in the path setup request message.

10. A method for calculating a path through an interconnected multi-domain network responsive to receipt of a path setup request message, the path setup request message identifying a source node and a destination node, wherein the network can be represented by a hierarchical routing structure comprising a bottom level and at least one upper level, the method comprising:
determining whether the source and destination nodes are in a common bottom level domain;
if the source and destination nodes are not in a common bottom level domain, determining a common ancestor hierarchical routing domain that includes ancestor nodes of both the source and destination nodes;
calculating an inter-domain path from the ancestor node of the source node to the ancestor node of the destination node in the common ancestor hierarchical routing domain, wherein the inter-domain path specifies, for each immediately lower-level domain, border nodes in the domain along a path from the source node to the destination node; and
for each bottom-level domain, calculating an intra-domain path between the border nodes that were determined for the domain.

11. The method of claim 10 further comprising repeating the calculation of an inter-domain path for each successively lower level until the bottom level is reached.

12. The method of claim 10 further comprising if the nodes are in the same bottom level domain, using an IaD-CSPF procedure to determine an intra-domain route from the source node to the destination node.

13. The method of claim 10 wherein the calculating an inter-domain path comprises using a traffic engineering network database ("TEDB") that stores network topology information for the common ancestor hierarchical routing domain.

14. The method of claim 10 wherein the determining comprises determining a lowest common ancestor hierarchical routing domain that includes the ancestor node of the source node and the ancestor node of the destination node.

15. The method of claim 10 wherein the path setup request message comprises a Soft Permanent Connection ("SPC") request.

16. The method of claim 10 wherein the connection request comprises a Switched Connection ("SC") request.

17. The method of claim 10 wherein the inter-domain path is calculated using an Inter-Domain Constraint-Based Shortest Path First ("IrD-CSPF") procedure.

18. The method of claim 10 wherein the intra-domain path is calculated using an Intra-Domain CSPF ("IaD-CSPF") procedure.

19. The method of claim 10 further comprising verifying legibility of traffic attributes in the path setup request message.

20. A system for calculating a network path in an interconnected multi-domain network, the system comprising:
means for receiving a path setup request message for a new traffic flow in the network, wherein the path setup request message identifies a source node in one domain of the network and a destination node in a second domain of the network;
means for determining a common ancestor hierarchical routing domain that includes ancestor nodes of both the source and destination nodes;
means for calculating an inter-domain path from the ancestor node of the source node to the ancestor node of the destination node in the common ancestor hierarchical routing domain that determines, for each lower-level domain, border nodes in the domain from the source node to the destination node using a traffic engineering network database ("TEDB") that stores network topology information for the common ancestor hierarchical routing domain; and
means for calculating an intra-domain path between the border nodes that were determined for each bottom-level domain.

21. The system of claim 20 wherein the means for determining comprises means for determining a lowest common ancestor hierarchical routing domain that includes the ancestor node of the source node and the ancestor node of the destination node.

22. The system of claim 20 wherein the path setup request message comprises a Soft Permanent Connection ("SPC") request.

23. The system of claim 20 wherein the connection request comprises a Switched Connection ("SC") request.

24. The system of claim 23 further comprising:

a local Domain Information Database ("DIDB"); and means for searching the local DIDB to confirm that a node that hosts a source TNA address is the source node.

25. The system of claim 20 wherein the means for calculating an inter-domain path comprises an Inter-Domain Constraint-Based Shortest Path First ("IrD-CSPF") procedure.

26. The system of claim 20 wherein the means for calculating an intra-domain path comprises an Intra-Domain CSPF ("IaD-CSPF") procedure.

27. The system of claim 20 further comprising means for verifying legibility of traffic attributes in the path setup request message.

28. An apparatus for calculating a network path in an interconnected multi-domain network representable by a hierarchical routing structure comprising a bottom hierarchical level and at least one upper hierarchical level, the apparatus comprising:

a routing controller ("RC") located at a domain of each upper hierarchical level;

a Traffic Engineering Database ("TEDB") associated with each RC;

a Domain Information Database ("DIDB") associated with each RC; and an inter-domain Constraint Based Shortest Path First ("IrD-CSPF") procedure for calculating an inter-domain path from an ancestor node of a source node identified in a path setup request message to an ancestor node of a destination node identified in the path setup request message, wherein the ancestor nodes are located in a lowest common ancestor hierarchy domain of the identified source and destination nodes; and at each bottom level domain, an intra-domain CSPF ("IaD-CSPF") procedure for calculating a path through the domain between a pair of border nodes identified for the domain by the IrD-CSPF procedure.

29. The apparatus of claim 28 wherein the TEDB stores network topology information for the common ancestor hierarchical routing domain.

30. The apparatus of claim 28 wherein the DIDB stores domain-related information of the domain.

* * * * *